United States Patent

Itokawa

[11] 3,812,586
[45] May 28, 1974

[54] CHROMATOGRAM READING INSTRUMENT

[75] Inventor: Hideji Itokawa, Tokyo, Japan

[73] Assignee: Funakoshi Pharmaceutical Co., Ltd., Tokyo, Japan

[22] Filed: Feb. 2, 1972

[21] Appl. No.: 222,766

[52] U.S. Cl. .................. 33/1 C, 33/1 SD, 33/75 R
[51] Int. Cl. ............................................ G06g 1/02
[58] Field of Search ........ 33/1 C, 1 SD, 75 R, 76 V, 33/76 R, 77, 115, 143 B

[56] References Cited
UNITED STATES PATENTS

| 2,412,901 | 12/1946 | McCoshen | 33/75 R |
| 3,482,319 | 12/1969 | Carey | 33/111 |

FOREIGN PATENTS OR APPLICATIONS

| 194,612 | 3/1923 | Great Britain | 33/75 R |
| 253,249 | 6/1926 | Great Britain | 33/75 R |

*Primary Examiner*—Louis R. Prince
*Assistant Examiner*—Richard R. Stearns
*Attorney, Agent, or Firm*—Edmond F. Shanahan

[57] ABSTRACT

An instrument for direct reading, without intermediate calculation, of interpretive indices of a chromatogram or the like. The instrument is comprised of an alignment table and a reading scale plate pivotally mounted on the alignment table. Both alignment table and reading scale plate are transparent, and are constructed to be placed directly over the subject chromatogram. Markings on the table provide for alignment with the chromatogram; the reading scale plate is movable to a prescribed position over the deposits on the chromatogram; the interpretive indices may then be read directly from a scale marked on the plate.

4 Claims, 4 Drawing Figures

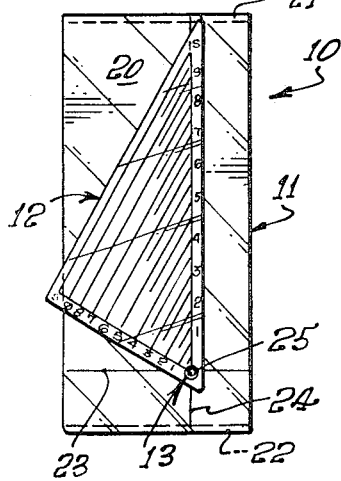
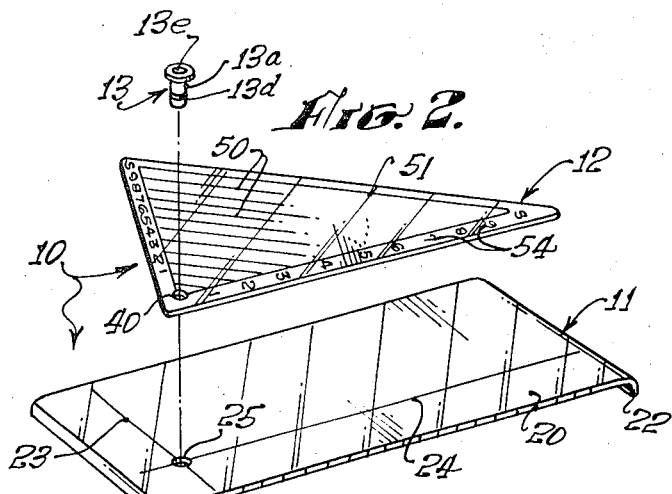
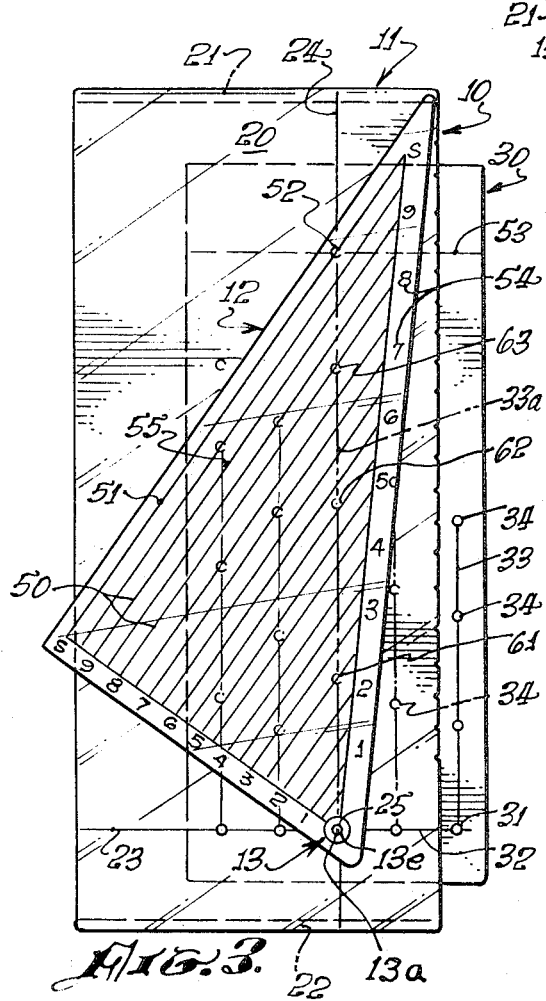
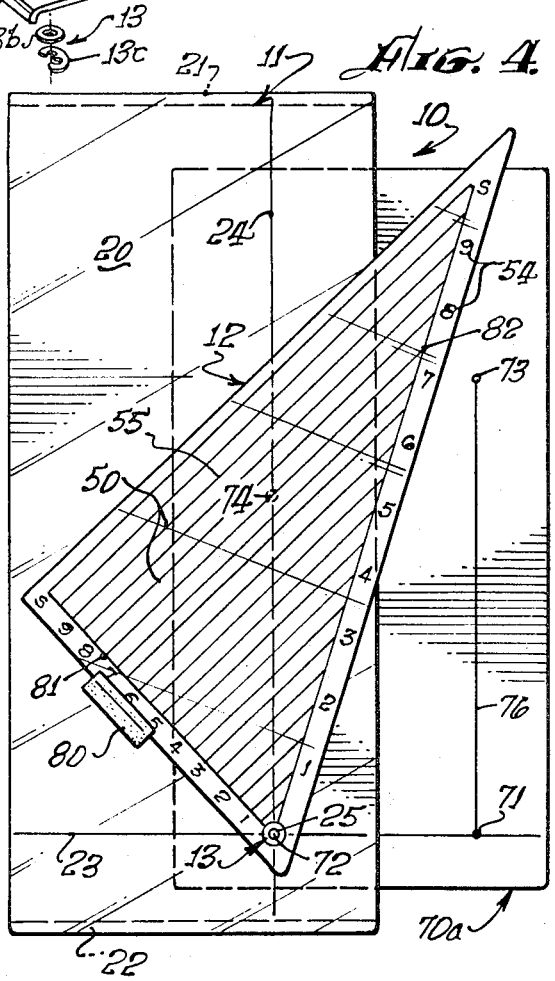

CHROMATOGRAM READING INSTRUMENT

This invention is an instrument for the direct reading of chromatograms or similar analytical plates. It is believed to be the first such instrument to become generally known (among those skilled in chromatography and the like) and available for the purpose.

For purposes of explaining the typical application and utility of the instrument, it will be described primarily in relation to its use in chromatography. However, as will be explained hereinafter, the instrument is useful not only in chromatography, but in the reading of analytical indices in certain other types of analytical technology, which produce analysis plates (as described hereinafter) having certain similarities to chromatograms.

Chromatography is a process for chemical analysis; presently, it is used mostly in the biochemical and the organic fields, but it is likely to find widespread future use in other fields of chemistry because it has proven to be a very convenient tool for quick and low cost analysis and identification. In general, chromatography is a process for separating gases, liquids, or solids, in a mixture or solution, by selective adsorption, as a stream containing the mixture flows over an adsorbent medium, herein referred to generally as a "plate." Each substance in the mixture tends to appear along the path of the stream at a different level, or band, or zone; often these bands are colored, or may be treated to become differently colored. The process name is derived from the color band characteristics observed in the separation path of many chromatograms.

Important information is derived from a chromatogram by taking measurements from it, and computing standard interpretive indices from these measurements, the most important index number being called the $R_f$ factor, which is described hereinafter.

Chromatography, is a relatively new technology. Its useful application was first developed in the 1940's, and at first it was known to and used by highly skilled scientists and technicians only; these skilled persons were capable of following the procedures necessary for arriving at the standard interpretive indices. However, in recent years, chromatography has become very widely used, and has been developed into a very complex and diverse technology, involving the making and reading of many thousands of chromatograms.

It is an important object of the present invention to provide an instrument for conserving the time of skilled users, and for enabling unskilled users to take over the task of interpreting chromatograms. The present instrument achieves this by making it possible for the user to read the $R_f$ factor directly from the chromatogram, without any need to take measurements or to make computations.

Although chromatography involves a great variety of techniques for the preparation of chromatograms, the following description of a typical procedure will aid in explaining the utility of the present invention. A typical procedure is as follows:

A very small quantity of the mixture of substances to be separated is dissolved in a suitable solvent, and a drop of the solution is deposited upon what may be referred to as a plate. Actually, the plate may be a sheet of treated or untreated filter paper; or the plate may be a glass, metal, or plastic plate, upon which there is a coating of suitable material such as an absorbent gel. The drop is allowed to dry, leaving a spot of the mixed substances.

This dried deposit, or other small deposit, is known in chromatography, and similar analytical technologies, as the "spot."

The spot is located near one end of the plat since it will be separated into constiuents by transport along the plate by a suitable transport solvent, as hereafter described. Often, several spots, sometimes including a standard spot of known mixture, are deposited along a line atone end of the plate, and at right angles to the longitudinal dimension of the plate. Such a line will be referred to herein as the "spot line."

In the next step, typically, the end of the plate nearest the spot line is immersed in a suitable transporting solvent, without immersion of the spots themselves. The transporting solvent moves from the solvent pool and over the plate toward the opposite end of the plate. However, it is predetermined that the movement of the transporting solvent will come to a stop after a period of time, usually a few hours, without reaching the other end of the plate. The line along which the transporting solvent comes to a stop is referred to as the "solvent front."

It will be understood that there are a great variety of solvents employed, and there are analytical methods which may use transporting media other than solvents. Also, the solvent may be caused to flow along the plate by ascending from a pool of solvent at the bottom of the plate, or by descending from a reservoir of solvent at the top of the plate. Moreover, the same substance may be subjected to treatment on different plates, by different solvents, and by different solvent methods in order to produce several different chromatograms. In general, chromatographic analysis is easy, quick, and inexpensive to employ, and it often occurs that a number of chromatograms will produce much desired information before elaborate and expensive analysis is undertaken. The instrument of the present invention finds utility in reading the interpretive indices from chromatograms of any type.

As the transporting solvent flows along the plate, it first encounters the spots of chemical mixtures disposed along the spot line. It flows over and past these spots, dissolving and carrying along with it substances from the spot.

Each of the component substances in the chemical mixture tends to move at a different rate from all the others. Consequently, the moving solvent defines a path of separated components downstream from the location of the spot. Component substances tend to locate along the straight line path of solvent transport, each compound clustering at its own separation point, also described as a separation band or separation zone. The path of transport will be referred to herein as the separation path. The great variety of physical and chemical reasons for the occurrence of the separation and the many variations in treatment which can be employed to produce different kinds of separation, are not relevant to any point of novelty of the present invention. The present invention may be usefully employed in reading any chromatogram, since certain standard separation rations have become established in chromatography. The interpretive index value which has become established as the most common standard method for reading a chromatogram is the $R_f$ value. This value is usually expressed as a percentage value, with reference to the solvent front as a 100 percent mark. The $R_f$ value designates the relative distance of travel for the substance at a particular separation point, with reference to the maximum possible travel (the solvent front), and is defined by the following equation:

$$R_f = \frac{\text{distance compound has moved from origin}}{\text{distance of solvent front from origin}} = \frac{x}{y}$$

For convenience, $R_f$ is expressed as a percentage by multiplying by 100. In that case, the index number is often referred to as "$hR_f$" value.

For example, an $hR_f$ of 50 would indicate that the compound had advanced half as far as the solvent front; an $hR_f$ of 25 would indicate a compound that had advanced only one-quarter as far as the solvent front.

The $R_f$ value is a constant when all conditions are exactly reproduced. It can therefore be used as an identifying characteristic of a compound, just as a melting or boiling point would be. Of course, the $R_f$ of a given compound will generally be different for different solvents, but this also is useful, as it is then possible to characterize a compound more specifically by specifying its $R_f$ in several solvents.

The instrument of the present invention can be used for reading plates produced by methods other than chromatography, where a value corresponding to the $R_f$ value of chromatography has similar identification significance. Analogous to the TLC plate, an $R_s$ value has been established for the measurement of relative flow rate in electrophoresis, thin layer gel filtration, etc. Also, the instrument of the present invention is employed usefully in reading the relative height of peaks in mass spectograms, atomic absorption spectograms, etc. It will be understood by those skilled in these various technologies that the reference value in many of them is not a solvent front, but the point or line defined on an analytical plate by a standard substance having known composition and characteristics. The performance of unknown substances on the same plate are then read with reference to the standard substance.

By means of the instrument of the present invention, a great variety of chromatograms and similar plates may be read by relatively unskilled persons, without handling the plate to take measurements from its surface and without making computations from the measured data.

A chromatogram can be spoiled by unskilled handling, or even by accidental touching. Another important object of the present invention is to reduce handling and touching of a chromatogram to a minimum, in order to determine the $R_f$ factors of the separation points on its surface.

The foregoing and other objects of the invention are accomplished by providing an instrument which is supported directly over the chromatogram without actually touching the chromatogram surface. The instrument readings and adjustments make it possible to read the $R_f$ factor directly, without handling the chromatogram, and without making computations.

The invention will be best understood from a reading of the following description of a preferred embodiment, which should be read with reference to the accompanying drawings, in which:

FIG. 1 is a plan elevational view of an instrument constructed according to the invention;

FIG. 2 is a perspective view of an exploded assembly of the instrument of FIG. 1;

FIG. 3 is a plan elevational view of the instrument of FIGS. 1 and 2 as it is actually in use for direct reading of the interpretive indices of a chromatogram; and FIG. 4 is a plan elevational view of the instrument of FIGS. 1 and 2 as seen in actual use for reading interpretive indices of a separation path of an unknown substance, with the instrument fixed in a position determined by a reference standard.

In FIG. 1, the instrument is indicated generally by the numeral 10. It will be seen from the perspective view of instrument 10, in exploded assembly, in FIG. 2, that it is comprised essentially of three parts: an alignment table 11; a reading scale plate 12; and a tubular pivot assembly 13.

Alignment table 11 and reading scale plate 12 are made from clear transparent material, such as a good quality of thick rigid plastic sheet. Transparency is essential, since the instrument 10 is used by laying it over a TLC plate (thin layer chromatography plate) or a similar analytical plate. It will be understood that the term "plate" is used herein collectively to include even paper chromatograms, electrophoresis plates, atomic absorption spectograms, etc. Typically, the plate is resting on a horizontal table top, and the instrument 10 is upported over the plate, with table 11, and reading scale plate 12 disposed in horizontal planes just above the chromatogram plate. The person using instrument 10 is usually looking directly down upon it and seeing it as viewed in the plan view of FIG. 1.

FIG. 2 reveals that alignment table 11 is comprised of a top panel 20, and a pair of supporting legs 21 and 22, which support top panel 20 just above the chromatogram plate, without touching it.

The top panel 20 is marked with two alignment lines 23 and 24, which are at right angles with one another and which intersect at a spot location hole 25. The line 23 may be identified as the spot line location, and is best located transversely of table 11, near its "lower" end (with respect to the view of the user). Line 24 may be referred to as the separation path alignment, and is intended to be placed in alignment with the path along which a spot at location 25 has been separated into constituents on the chromatogram plate.

FIG. 3 shows instrument 10 in a typical position over plate 30. Typically, plate 30 has several spots 31 located along a spot line 32 at its lower end. As a result of treatment of plate 30, each of these spots has had its constituents transported for varying distances along parallel transport lines 33, producing different separations for the different spot compositions, as indicated by the many separation points 34. (These may appear as slightly elongated bands or zones.)

Effective use of instrument 10 requires that it be disposed with the best alignment reasonably possible and that spot location hole 25 be directly over one of the spots 31, as nearly as it is practical to locate it.

The reading scale plate 12 lays upon the top panel 20 of alignment table 11, and is pivotally fastened to the top panel 20 by means of the pivot assembly 13 which passes through a hole 40, in reading scale plate 12, and also through spot location hole 25.

Precise location of instrument 10 over one of the spots 31 is facilitated by the use of a tubular pivot shaft 13a, which may conveniently be retained in position by a washer 13b and a snap ring 13c received in an annular groove 13d. The person using instrument 10 may begin with precise alignment and good spot location by carefully viewing the subject spot (spot 31a in FIG. 3) directly through the spot locating tubular passage 13e in tubular pivot shart 13a.

In the preferred form of the invention, the reading scale plate 12 is in the form of a 30° – 60° right triangle, with pivot hole 40 near the 60° angle. Regardless of the particular shape of reading scale plate 12, its surface should be marked with a reading scale system based on two lines radiating from pivot 13 (which is also the locus of spot 31a and spot location hole 25), and a series of straight lines connecting equally spaced numbered markings on the two radiating lines. It is a preferred form of the invention to utilize a series of numbered parallel lines disposed at right angles to one of the radial lines. Also, using the 30° – 60° angle triangle provides the user with the conveneint option of making a half-size reading if the particular chromatogram plate requires it. Computation is thus simplified. However, it will be understood that other forms of reading scales might be employed; for example, subject to suitable computation, any triangular arrangement of scale reading lines might be employed, or even spaced circular lines at varying radii from the spot location 31a. Special applications might require scale reading line spacing to be arranged at other than equal spacing.

Also, triangles other than right triangles may be used for the reading scale. A series of succesively larger triangles having a common apex at pivot 13, and any triangle angles can be employed. However, it is a much preferred form of the invention to utilize the succession of 30° – 60° right triangles, with equally spaced reading lines, as seen in FIGS. 2 and 3. This form of reading scale marking has been found to be admirably suited for reading the indices of chromatogram plates and the like.

In the standard marking system illustrated, parallel lines 50, which are spaced at equal intervals radially from the location of pivot 13, are numbered to correspond to the percentage system employed for the most useful index number, the $R_f$ number already discussed. The outermost line, corresponding to the numeral 10 or 100 percent, is marked with the letter S, and is referred to as the "S-line."

FIG. 3 shows a typical use of the instrument 10. It has been aligned with spot line 32, spot 31a, and separation line 33a. A series of separation points 61, 62, and 63 are seen to be located along separation line 33a.

After alignment table 11 has been placed in the alignment position as shown in FIG. 3, the reading scale plate 12 is rotated about pivot 13 to place the S—S line 51 in intersection with the solvent intersection point 52, on the plate 30. The solvent front interesection point 52, is the intersection between the solvent front line 53 and the separation line 33a.

The $R_f$ numbers for the separation spots 61, 62, and 63, may now be read directly from the digits 54 located for each of the corresponding parallel lines 55, which comprise the reading scale measurement.

FIG. 4 illustrates the use of instrument 10 on certain types of plates, other than chromatographic plates, where the reference line is not the solvent front 53, but the point reached by a reference substance. A plate 70a has been treated with a spot of reference substance 71, and of unknown 72. The reference substance has advanced to a point 73, whereas the unknown substance has reached point 74. The instrument 10 has first been placed in alignment with the spot line 75, and the standard substance line 76, with the S-line passing through standard substance spot 73. The reading scale plate is then fastened in position, as by means of a piece of masking tape 80.

Once reading scale 12 of instrument 10 has been fastened in position as shown in FIG. 4, instrument 10 may be shifted to alignment with an unknown substance as illustrated in FIG. 4, and the indicated index number may be read as indicated at the line 81–82. For purposes of illustration, only one unknown substance is shown, but it will be appreciated that plate 70 would usually incorporate several unknowns, or several standard substances.

I claim:
1. An instrument for reading interpretive indices from a chromatogram or the like, wherein a spot of subject substance is deposited upon a plate and treated to produce differential transport of constituents of the spot along a separation path, which instrument includes:
an alignment table comprising
a base panel of transparent material, and
supporting legs extending from the base panel for supporting said base panel spaced above and parallel to, but not contacting, said base plate and closely adjacent thereto,
said base panel having markings including
a spot location point for disposition over said spot on said plate, and
a line extending from said spot location point and disposed to be placed in alignment over said separation path;
a reading scale plate made of transparent material and disposed in a plane parallel to and above siid base panel and immediately adjacent thereto pivot means at a spot location point on said base panel, said reading scale plate being pivotably attached to said base panel by said pivot means, said reading scale plate having markings including:
first and second radial lines extending from said spot location point at an angle with each other, and
a series of parallel lines intersecting said first and second radial lines, forming a succession of similar triangles of increasing size; and
number calibrations along said first and second radial lines.

2. An instrument as described in claim 1 in which said succession of triangles is comprised of right triangles having a leg and hypotenuse along said radial lines.

3. An instrument as described in claim 2 in which the angle between said first and second radial lines is a 60° angle, said right angle triangles are formed by a succession of spaced parallel lines opposite said 60° angle, said parallel lines are equally spaced from one another and are numbered in multiples of 10 up to and including 100 on both said first and second radial lines to permit the reading at said lines in terms of a percentage.

4. An instrument as described in claim 1 in which said pivot means is tubular to permit alignment of said alignment table by viewing a spot through an axial tubular opening in said tubular pivot.

* * * * *